United States Patent
Zou et al.

(10) Patent No.: US 8,199,488 B2
(45) Date of Patent: Jun. 12, 2012

(54) DISPLAY HOUSING

(75) Inventors: Zhi-Gang Zou, Shenzhen (CN);
Zhi-Gang Peng, Shenzhen (CN);
Qing-Bin Zeng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 346 days.

(21) Appl. No.: 12/509,011

(22) Filed: Jul. 24, 2009

(65) Prior Publication Data
US 2010/0061044 A1 Mar. 11, 2010

(30) Foreign Application Priority Data
Sep. 5, 2008 (CN) .......................... 2008 1 0304378

(51) Int. Cl.
*G06F 1/16* (2006.01)
(52) U.S. Cl. ........... 361/679.55; 361/679.56; 312/223.1; 312/223.2; 349/58; 349/60
(58) Field of Classification Search ............ 361/679.21, 361/679.55, 679.56; 349/60
See application file for complete search history.

(56) References Cited

U.S. PATENT DOCUMENTS

| | | | | |
|---|---|---|---|---|
| 6,064,453 | A * | 5/2000 | Inubushi et al. | 349/58 |
| 6,507,377 | B1 * | 1/2003 | Jung | 349/60 |
| 7,304,837 | B2 * | 12/2007 | Lo et al. | 361/679.27 |
| 7,593,070 | B2 * | 9/2009 | Ogawa | 349/58 |
| 7,626,654 | B2 * | 12/2009 | Tsubokura et al. | 349/60 |
| 7,697,281 | B2 * | 4/2010 | Dabov et al. | 361/679.55 |
| 7,760,289 | B2 * | 7/2010 | Nakanishi et al. | 349/60 |
| 7,911,774 | B2 * | 3/2011 | Nakanishi et al. | 361/679.21 |
| 7,924,360 | B2 * | 4/2011 | Cheng et al. | 349/58 |
| 2001/0002145 | A1 * | 5/2001 | Lee et al. | 349/58 |
| 2003/0103173 | A1 * | 6/2003 | Satonaka | 349/58 |
| 2006/0119760 | A1 * | 6/2006 | Okuda | 349/58 |
| 2006/0146486 | A1 * | 7/2006 | Wikstrom et al. | 361/681 |
| 2007/0064378 | A1 * | 3/2007 | Lo et al. | 361/681 |
| 2007/0241991 | A1 * | 10/2007 | Tsai | 345/7 |
| 2008/0123271 | A1 * | 5/2008 | Shu | 361/681 |
| 2008/0165485 | A1 * | 7/2008 | Zadesky et al. | 361/683 |
| 2009/0049773 | A1 * | 2/2009 | Zadesky et al. | 52/204.62 |
| 2009/0257207 | A1 * | 10/2009 | Wang et al. | 361/752 |

* cited by examiner

*Primary Examiner* — Anthony Q Edwards
(74) *Attorney, Agent, or Firm* — Altis Law Group, Inc.

(57) ABSTRACT

A display housing includes a protective lens, a peripheral housing; and a strengthening member. The protective lens defines a latching slit along its perimeter. The strengthening member includes a base portion and a bent portion. One of the peripheral housing and the base portion has a plurality of latches protruding therefrom and the other a plurality of latching holes. The latches are received in the latching holes, the strengthening member is secured in the peripheral housing, and the bent portion is received in the latching slits.

12 Claims, 6 Drawing Sheets

DISPLAY HOUSING

BACKGROUND

1. Technical Field

The present disclosure relates to display housings, and particularly to a display housing including a protective lens for a portable electronic device.

2. Description of Related Art

Portable electronic devices commonly use their assembled protective lens for protecting their inside display devices. In use, users can view the images from the display device beneath the protective lens. The protective lens may be secured in the display housings by adhesive glues. However, with large display housings and protective lenses, it can be difficult to achieve dependable adhesion between the display housing and protective lens. Moreover, adhesive often hardens over time, rendering it ineffective.

Therefore, there is room for improvement within the art.

BRIEF DESCRIPTION OF THE DRAWING

Many aspects of the new display housing can be better understood with reference to the following drawings. The components in the drawings are not necessarily drawn to scale, the emphasis instead being placed upon clearly illustrating the principles of the new display housing. Moreover, in the drawings, like reference numerals designate corresponding parts throughout the several views.

DETAILED DESCRIPTION

Figure 1:
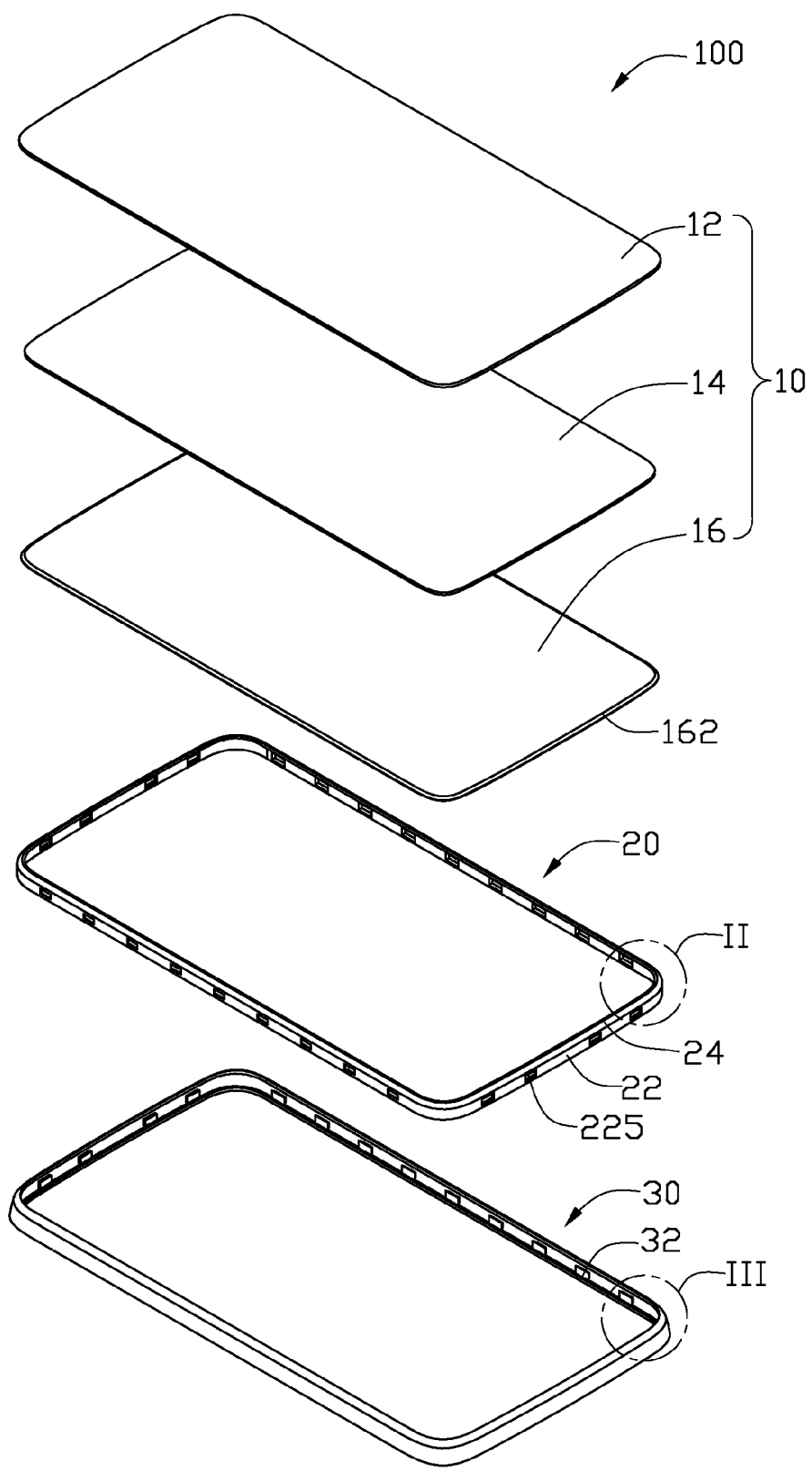
FIG. 1 is an exploded, isometric view of a display housing according to an exemplary embodiment.

FIG. 1 shows an exemplary display housing 100 in an exploded view including a protective lens 10, a strengthening member 20 and a peripheral housing 30.

Figure 4:
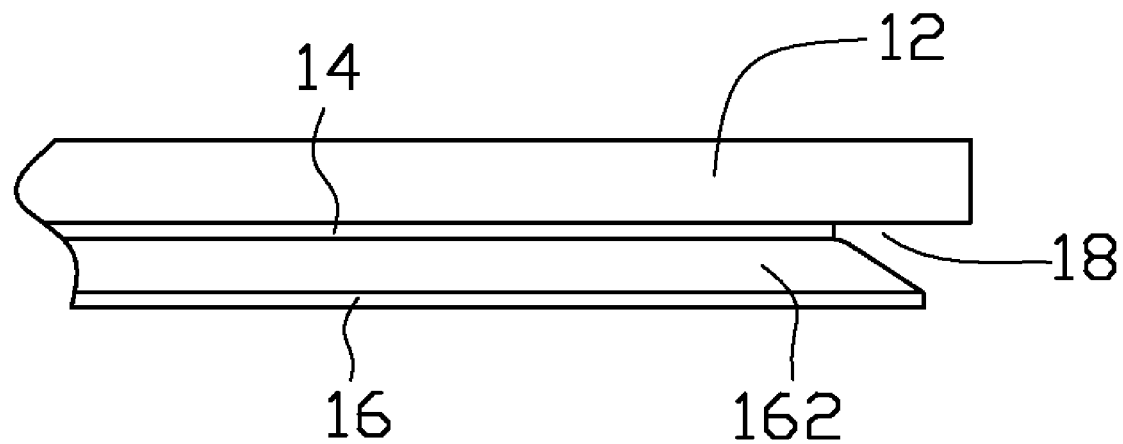
FIG. 4 is a partially assembled view of a protective lens shown in FIG. 1.

Referring further to FIG. 4, the protective lens 10 can be a laminated glass including a first glass layer 12, an adhesive layer 14 and a second glass layer 16. The first glass layer 12 and the second glass layer 16 can be typical glass. The adhesive layer 14 can be silicon, acrylic, polyurethane, epoxy resin, or other glue, and is applied between the first glass layer 12 and the second glass layer 16 for bonding the two together. The first glass layer 12 overlaps the second glass layer 16. Two opposite edges of the second glass layer 16 are cut to from two opposite inner bevel portions 162 towards the first glass layer 12. Accordingly, a latching slit 18 encircling the perimeter of lens 10 is formed by the first glass layer 12 and the bevel portions 162 on the periphery of the protective lens 10.

Figure 2:
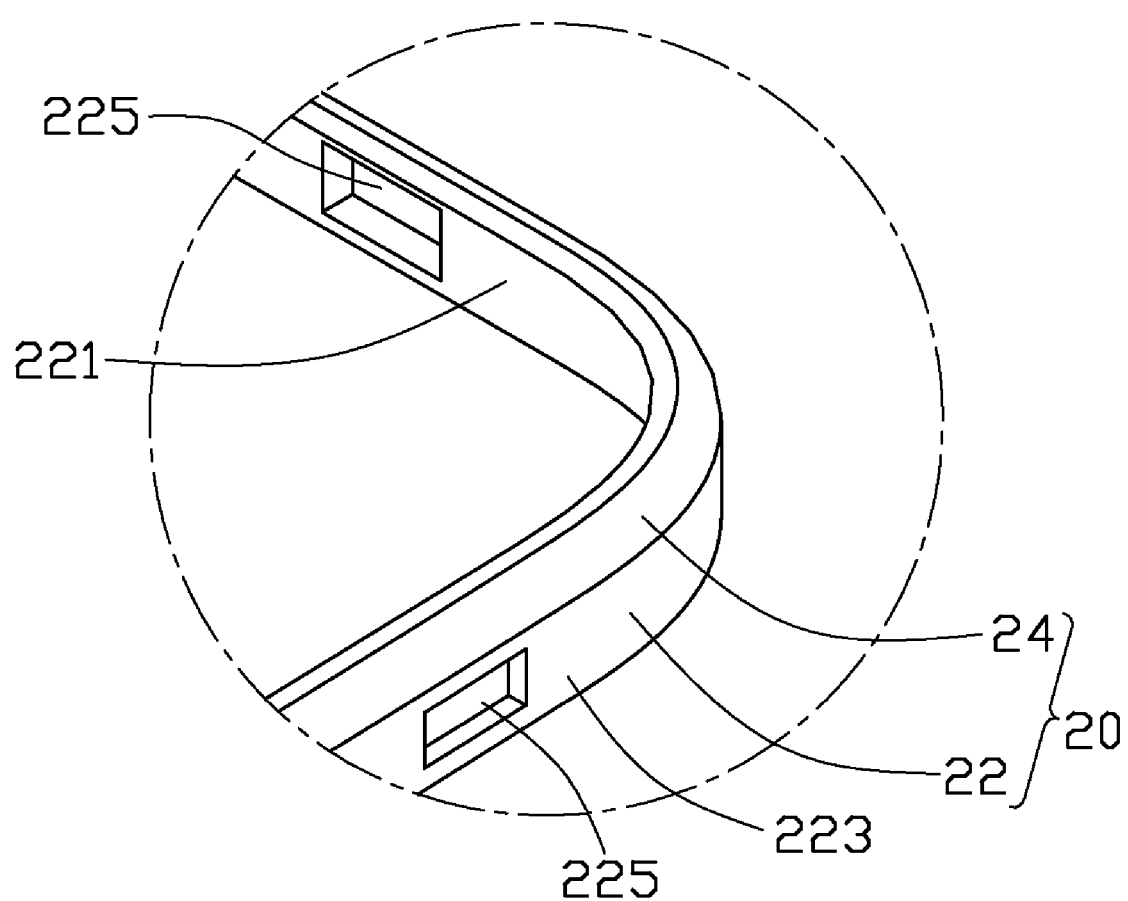
FIG. 2 is an enlarged view of II-II section of FIG. 1.

Referring to FIGS. 1 and 2, the strengthening member 20 is a flexible enclosed frame corresponding to the inner periphery of the protective lens 10. The strengthening member 20 includes a base portion 22 and a bent portion 24. The base portion 22 includes an inner surface 221 and an external surface 223. The base portion 22 defines a plurality of spaced wedge-shaped latching holes 225 through the inner surface 221 and the external surface 223. The bent portion 24 is generally triangular and protrudes from the top surface of the base portion 22.

Figure 3:
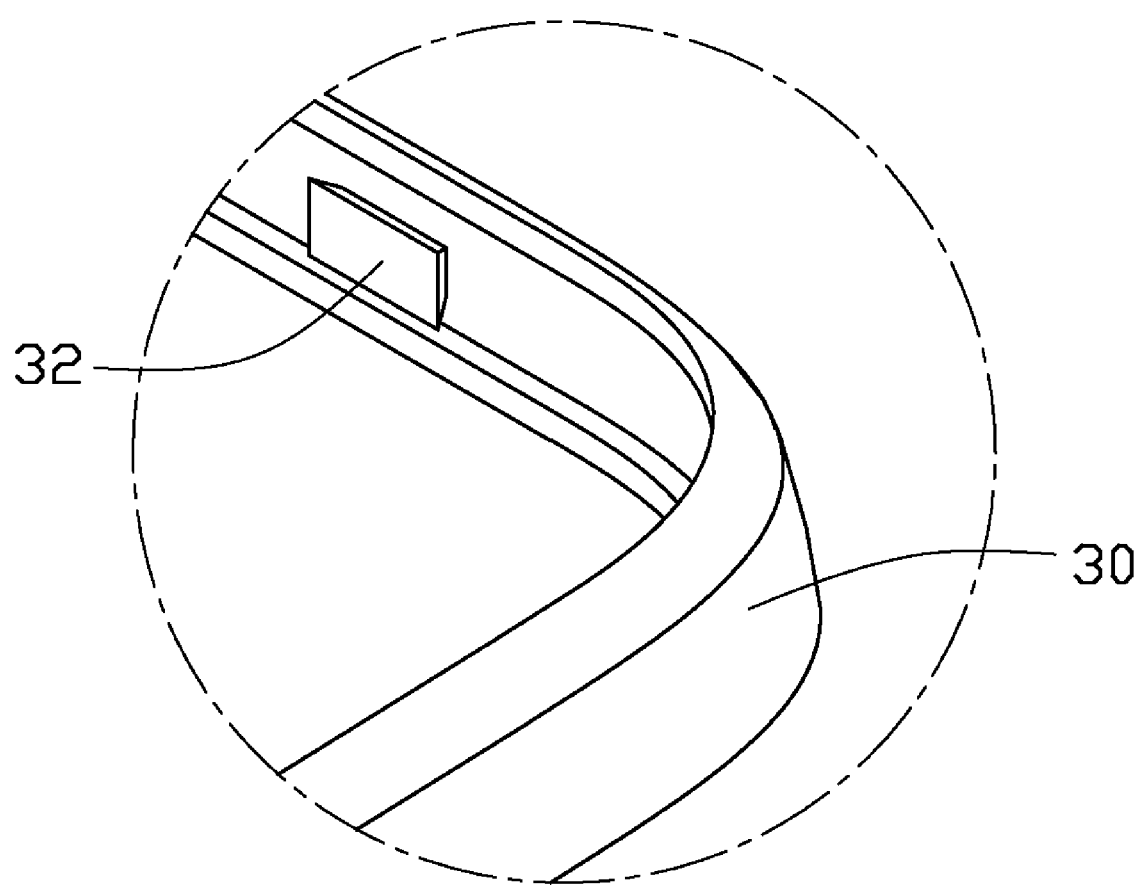
FIG. 3 is an enlarged view of III-III section of FIG. 1.

Referring to FIGS. 1 and 3, the peripheral housing 30 is a rigid enclosed frame corresponding to, abutting, and engaging the strengthening member 20. The peripheral housing 30 has a plurality of latches 32 separately projecting from its interior surface towards its center. The plurality of latches 32 are wedge-shaped corresponding to and for receipt in the plurality of latching holes 225.

Figure 5:
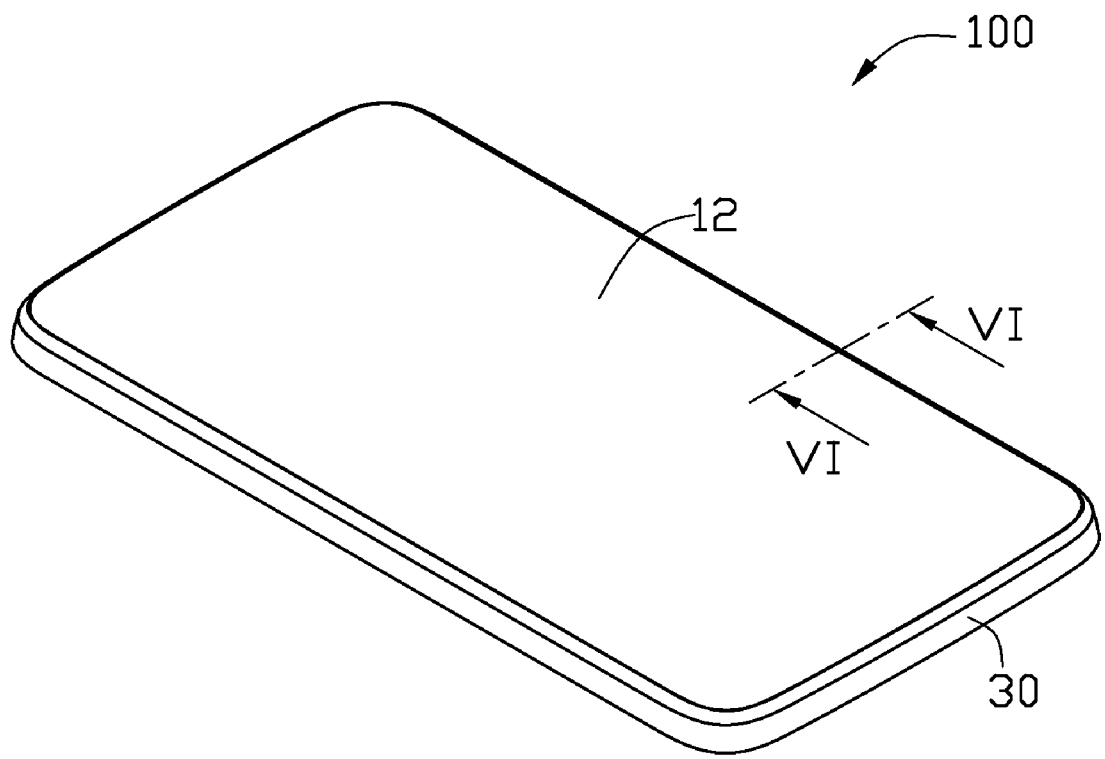
FIG. 5 is an assembled view of the display housing shown in FIG. 1.
Figure 6:
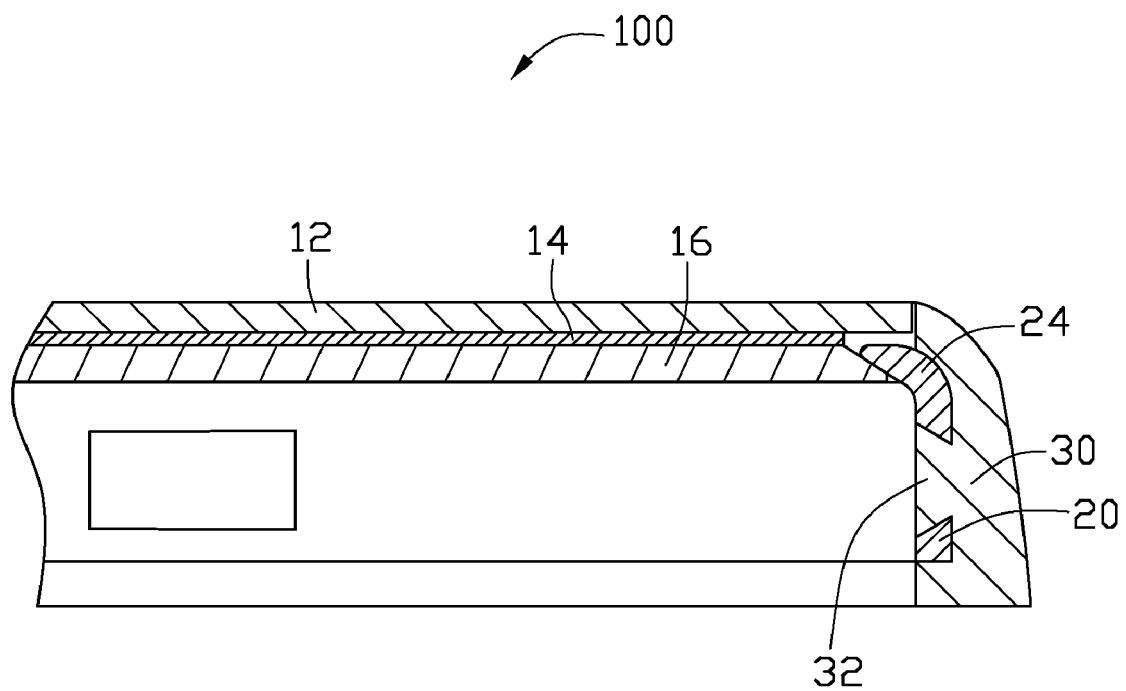
FIG. 6 is a cross-section of the assembled display housing shown in FIG. 5, taken alone line VI-VI.

Referring to FIGS. 5 and 6, after assembly, the strengthening member 20 is engagingly received in the peripheral housing 30 along with the latches 32 engaging the latching holes 225. As such, the bent portion 24 engages the latching slit 18 around the perimeter of the lens 10. The two latchings enable the protective lens 10 to be secured by the strengthening member 20 relative to the peripheral housing 30.

It is to be understood that the peripheral housing 30 can alternatively be integrally insert molded with the strengthening member 20.

It is also to be understood that the arrangement of the latching holes 225 and the latches 32 can be reversed, so that the latching holes 225 are defined in the peripheral housing 30, and the latches 32 protrude from the strengthening member 20.

It is to be understood, further, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A display housing, comprising:
   a protective lens defining a latching slit along the periphery thereof and comprising a first glass layer, an adhesive layer, and a second glass layer, the first glass layer bonded to the second glass layer by the sandwiched adhesive layer, the second glass layer comprising two opposite edges cut to form two opposite inner bevel portions towards the first glass layer;
   a peripheral housing; and
   a strengthening member comprising a base portion and a bent portion connecting with the base portion;
   wherein one of the peripheral housing and the base portion has a plurality of latches protruding therefrom, and the other of the peripheral housing and the base portion defines a plurality of latching holes, the latches engaging the latching holes, the strengthening member secured in the peripheral housing, and the bent portion received in the latching slit.

2. The display housing as claimed in claim 1, wherein the adhesive layer is silicon glue, acrylic glue, polyurethane glue, or epoxy resin glue.

3. The display housing as claimed in claim 1, wherein the base portion comprises an inner surface and an external surface through which the latching holes are spaced and defined, and the bent portion is bent from the base portion towards the inner surface.

4. The display housing as claimed in claim 3 wherein the latching holes and the latches are wedge-shaped.

5. The display housing as claimed in claim 1, wherein the strengthening member comprises a flexible enclosed frame, and the peripheral housing is a rigid enclosed frame corresponding to the strengthening member.

6. The display housing as claimed in claim 1, wherein the peripheral housing is integrally insert molded with the strengthening member.

7. A display housing, comprising:
- a protective lens defining a latching slit along its perimeter and comprising a first glass layer, a second glass layer, and an adhesive layer sandwiched therebetween, the first glass layer overlapping and bonded to the second glass layer by the adhesive layer, the second glass layer comprising edges cut to form an inner bevel portion towards the first glass layer, the latching slit enclosed by the inner bevel portion and the first glass layer;
- a peripheral housing; and
- a strengthening member comprising a base portion and a bent portion protruding from the base portion, the bent portion being received in the latching slit;
- wherein one of the peripheral housing and the base portion comprises a plurality of latches protruding therefrom, the other of the peripheral housing and the base portion defines a plurality of latching holes receiving the latches therein, wherein the interaction of the latching holes and the latches enable the protective lens to be secured by the strengthening member relative to the peripheral housing.

8. The display housing as claimed in claim 7, wherein the adhesive layer is silicon glue, acrylic glue, polyurethane glue, or epoxy resin glue.

9. The display housing as claimed in claim 7, wherein the base portion comprises an inner surface and an external surface through which the latching holes are spaced and defined, and the bent portion is bent from the base portion towards the inner surface.

10. The display housing as claimed in claim 9, wherein the latching holes and the latches are wedge-shaped.

11. The display housing as claimed in claim 7, wherein the strengthening member comprises a flexible enclosed frame, and the peripheral housing is a rigid enclosed frame corresponding to the strengthening member.

12. The display housing as claimed in claim 7, wherein the peripheral housing is integrally insert molded with the strengthening member.

* * * * *